(12) United States Patent
Fonseca et al.

(10) Patent No.: US 7,528,060 B1
(45) Date of Patent: May 5, 2009

(54) BRANCHED NANOSTRUCTURES AND METHOD OF SYNTHESIZING THE SAME

(75) Inventors: Luis F. Fonseca, San Juan, PR (US); Oscar Resto, San Juan, PR (US); Francisco Solá, San Juan, PR (US)

(73) Assignee: University of Puerto Rico, San Juan, PR (US)

( * ) Notice: Subject to any disclaimer, the term of this patent is extended or adjusted under 35 U.S.C. 154(b) by 103 days.

(21) Appl. No.: 11/260,710

(22) Filed: Oct. 27, 2005

(51) Int. Cl.
*H01L 21/44* (2006.01)
(52) U.S. Cl. .................................. 438/609
(58) Field of Classification Search ............. 257/734, 257/741, 746, 749; 438/602–610
See application file for complete search history.

(56) References Cited

U.S. PATENT DOCUMENTS

| | | | |
|---|---|---|---|
| 6,791,338 B1 | 9/2004 | Bratkovski et al. | |
| 6,855,202 B2 | 2/2005 | Alivisatos et al. | |
| 6,878,871 B2 | 4/2005 | Scher et al. | |
| 6,882,051 B2 | 4/2005 | Majumdar et al. | |

OTHER PUBLICATIONS

Xin-Yun Xie et al, "Preparation and field-emission property of nanoscale silicon on different substrates by using electron beam evaporation," Journal of Functional Materials and Devices, Jun. 2003, vol. 9, No. 2 p. 147-149.*

JP Zou et al, "Branchy alumina nanotubes," Applied Physics Letters, 2002, vol. 80, p. 1079-1081.*
D. Milcius et al, "Role of grain boundaried in the mechanicsm of plasma hydrogenation of nanocrystalline MgAl films," AIP Conference Proceedings, Jun. 2005, No. 837, p. 22-33.*
F. Banhart—Laplacian growth of amorphous carbon filaments in a non-diffusion-limited experiment—*Physical Review E*—1995—pp. 5156-5162—US.
H. Z. Wang, O. Wu, H. G. Zhu, D. Li, X. H. Liu and X. Wang—Fractal carbon trees on polymer and metal substrates in TEM observation—*Journal of Materials Science Letters*—2000—pp. 2225-2226—US.
H. Z. Wang, X. H. Liu, X. J. Yang and X. Wang—Intergrowth of a carbon layer and fractal-like trees on 3Y-TZP in TEM observations—*Materials Science & Engineering*—2001—pp. 180-184—US.
Kimberly A. Dick, Knut Deppert, Magnus W. Larsson, Thomas Martensson, Werner Seifert, L. Reine Wallengerb and Lars Samuelson—Synthesis of branched 'nanotrees' by controlled seeding of multiple branching events—*Nature Materials*—2004—pp. 1-5—Sweden.
Liberato Manna, Delia J. Milliron, Adreas Meisel, Erik C. Scher and A. Paul Alivisatos—Controlled growth of tetrapod-branched inorganic nanocrystals—*Nature Materials*—2003—pp. 382-385—USA.

(Continued)

*Primary Examiner*—Calvin Lee
(74) *Attorney, Agent, or Firm*—Hoglund & Pamias, PSC; Roberto J. Rios (57) ABSTRACT

A branched nanostructure is synthesized. A porous material, with pores having a diameter of approximately 1 μm or less, is placed in a vacuum. It is irradiated with an electron beam. This causes a trunk to grow from the porous material and further causes branches to grow from the trunk.

24 Claims, 8 Drawing Sheets

OTHER PUBLICATIONS

Jun Zhou, S. Z. Deng, Jun Chen, J. C. She and N. S. Xu—Synthesis of crystalline alumina nanowires and nonotrees—*Chemical Physics Letters*—2002—pp. 384-508—China.

Puxian Gao, Zhong Lin Wang—Self-Assembled Nanowire—Nanoribbon Junction Arrays of ZnO—*The Journal of Physical Chemistry*—2002—pp.

Liberato Manna, Erik C. Scher, and A. Paul Alivisatos—Synthesis of Soluble and Processable Rod-, Arrow-, Teardrop-, and Tetrapod-Shaped CdSe Nanocrystals—*Journal American Chemical Society*—2000—pp. 12700-12706—USA.

Jing Yu Lao, Jian Gu Wen, and Zhi Feng Ren—Hierarchical ZnO Nanostructures—*Journal American Chemical Society*—2002—pp. 1287-1291—USA.

Mark S. Gudiksen, Lincoln J. Lauhon, Jianfang Wang, David C. Smith, and Charles M. Lieber—Growth of nanowire superlattice structures for nanoscale photonics and electronics—*Nature*—2002—pp. 617-620—USA.

Jiangtao Hu, Min Ouyang, Peidong Yang, and Charles M. Lieber—Controlled growth and electrical properties of heterojunctions of carbon nanotubes and silicon nonowires—*Nature*—1999—pp. 48-51—USA.

Yi Cui and Charles M. Lieber—Functional Nanoscale Electronic Devices Assembled Using Silicon Nanowire Building Blocks—*Science Magazine*—2001—pp. 851-853—USA.

Deli Wang and Charles M. Lieber—Nanocrystals branchout—*Nature*—2003—pp. 355-356—USA.

Deli Wang, Fang Qian, Chen Yang, Zhaohui Zhong, and Charles M. Lieber—Rational Growth of Branched and Hyperbranched Nanowire Structures—*Journal American Chemical Society*—2003—pp. 871-874—USA.

A. G. Cullis, L. T. Canham and P. D. J. Calcott—The structural and luminescence properties of porous silicon—*Journal of Applied Physics*—1997—pp. 909-965—USA.

L. T. Canham, A. G. Cullis, C. Pickering, O. D. Dosser, T. I. Cox, and T. P. Lynch—Luminescent anodized silicon aerocrystal networks prepared by supercritical drying—*Nature*—1994—pp. 133-135—USA.

Y. Posada, L. San Miguel, L. F. Fonseca, O. Resto, S. Z. Weisz, C. H. Kim and J. Shinar—Optical properties of nanocrystalline silicon within silica gel monoliths—*Journal of Applied Physics*—2004—pp. 2240-2243—USA.

O. Resto, L. F. Fonseca, S. Z. Weisz, A. Many, and Y. Goldstein—Plasmons on Luminescent Porous Silicon Prepared with Ethanol—*Mat. Res. Soc. Symp. Proc.*—1999—pp. 1-8—USA.

* cited by examiner

BRANCHED NANOSTRUCTURES AND METHOD OF SYNTHESIZING THE SAME

STATEMENT REGARDING FEDERALLY SPONSORED RESEARCH

This invention was made with Government support under Grant No. NCC3-1034, from the NASA Center for Nanoscale Materials. The Government has certain rights in this invention.

FIELD OF THE INVENTION

The invention generally relates to the formation of branched nanostructures and more specifically to methods of synthesizing one-branch and multi-branched nanostructures by an electron beam irradiation process.

BACKGROUND OF THE INVENTION

Substantial development efforts have recently focused on the synthesis of nanotubes and nanorods. These are needed for interconnecting circuits, sensors, optoelectronics and other nano-sized elements in the field that is now known as nanotechnology. These connections are needed to make ultra-compact devices.

One example of such development efforts is found in U.S. Pat. No. 6,882,051, titled "Nanowires, Nanostructures and Devices Fabricated Therefrom," which issued to Mujamdar, et al., on Apr. 19, 2005. This patent discloses methods of fabricating and doping one-dimensional nanostructures having uniform diameters of less than approximately 200 nm.

While one-dimensional nanostructures are useful to connect two elements, branching of nanotubes and nanorods is important because it permits the interconnection of multiple elements. Substantial development efforts have produced branching for a variety of elements and methods. For one example, Dick, et al., "Synthesis of Branched 'Nanotrees' by Controlled Seeding of Multiple Branching Events," Nature Materials, 3, 380 (2004), teaches methods of synthesizing branched GaP nanostructures by sequential seeding with metal nanoparticles.

To date, however, the prior art does not teach the synthesis of branched nanostructures by methods that can individually control in situ the growth process, specially for silicon- and carbon-derived nanostructures. Because of these materials' properties they are widely used in the electronics industry and in fabricating nanoscale devices. While silicon nanowires have been synthesized, there remains a need for branched and multi-branched silicon nanostructures. This invention also addresses that need.

SUMMARY OF THE INVENTION

According to one aspect of the invention, a method of growing a branched silicon-derived nanostructures begins by providing a porous silicon substrate. This is placed in the vacuum chamber of a transmission electron microscope. An electron beam is directed at the edge of the porous silicon substrate, which causes a branched silicon nanostructure to grow.

According to further aspects of the invention, the porous silicon substrate has pores with a diameter of approximately a μm or less. The porous silicon substrate is made by electrochemical anodization of a solid silicon wafer. The silicon wafer is approximately 200-300 μm thick with <100> crystalline orientation on a polished surface. The vacuum chamber is evacuated below at least $5 \times 10^{-6}$ Torr. The branched silicon nanostructure has a body and at least two branches.

The total length of the branched nanostructure, the body diameter and the branches' diamters can be controlled by adjusting the electron beam irradiation parameters. The total length can be as low as 5 nm to greater than 1000 nm. The diameter of the body and branches can be as low as only a few nanometers to as much as 100 nm or greater.

According to another aspect of the invention, a branched nanostructure is synthesized from a porous material having pores with a diameter of approximately 1 μm or less. The porous material is placed in a vacuum. The porous material is irradiated with an electron beam. The electron beam causes a trunk to grow from the porous material and further causes branches to grow from the trunk.

According to further aspects of the invention, the porous material has pores 1 micron or less in diameter and is composed of silicon or alumina. The porous substrate is placed in the vacuum chamber of a transmission electron microscope. The intensity of the electron beam is adjusted based upon growth of the trunk and branches. The electron beam has a potential difference of 100 kV and the electron bombardment continues for less than an hour. The trunk and branches have a diameter of less than 100 nm. At least one of the branches has a length of at least 1000 nm.

BRIEF DESCRIPTION OF THE DRAWINGS

FIG. 4(*a*) is a photograph showing a surface of a porous substrate after initial electron beam irradiation.

FIG. 4(*b*) is a schematic diagram showing the initial growth from a porous substrate.

FIGS. 5(*a*) through (*f*) are photographs showing the growth of a branched nanostructure from a porous substrate, taken at regular temporal intervals.

DETAILED DESCRIPTION OF THE INVENTION

Multi-branched silicon is prepared from a porous film such as a porous silicon (PSi) freestanding film. The film is attached to the grid of a transmission electron microscope (TEM). A vacuum is applied and an electron beam is directed toward the edge of the film. As a first step, electron intensity is increased until local heating induces the porous structure to develop into a less porous material at the region of interest. As a second step, the intensity is decreased and adjusted until nanorods begin to grow from the surface of the film. Further application of the electron beam will cause continued growth of the nanorods followed by branching. The thickness and length of the nanorods and branches can be increased (or decreased) by increasing (or decreasing) the electron-beam intensity and/or irradiation time.

Figure 1:
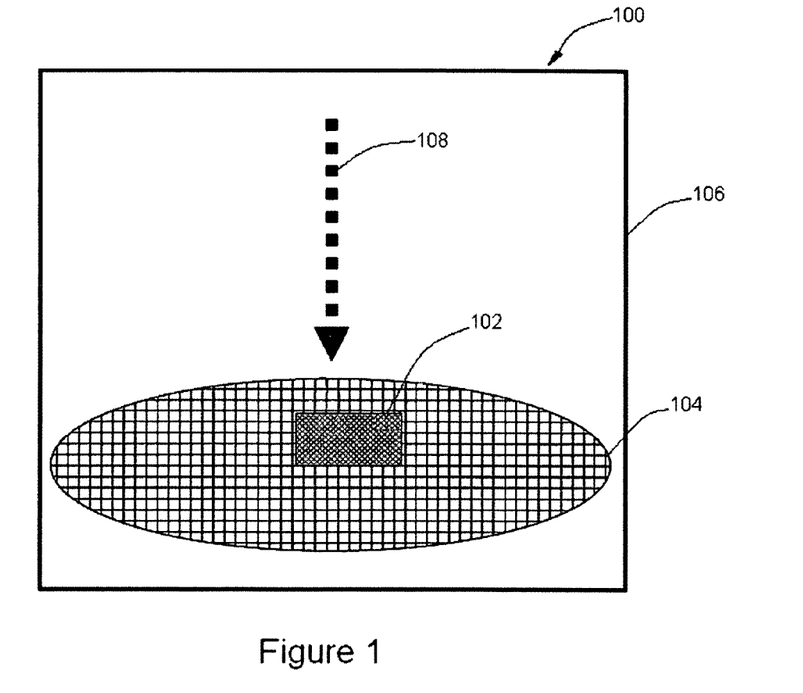
FIG. 1 is a schematic diagram illustrating a method of synthesizing a branched nanostructure in TEM.

Turning to FIG. 1, a schematic diagram showing a configuration for synthesis of a branched silicon nanostructure is described. A PSi film 102 is attached to grid 104. The grid 104 is a standard grid used to handle samples for TEM 100 analysis. TEM 100 includes a vacuum chamber 106. The grid 104 and attached PSi film 102 are inside the vacuum chamber 106. After evacuating the vacuum chamber 106, an electron beam 108 is directed at the PSi film 102.

Figure 2:
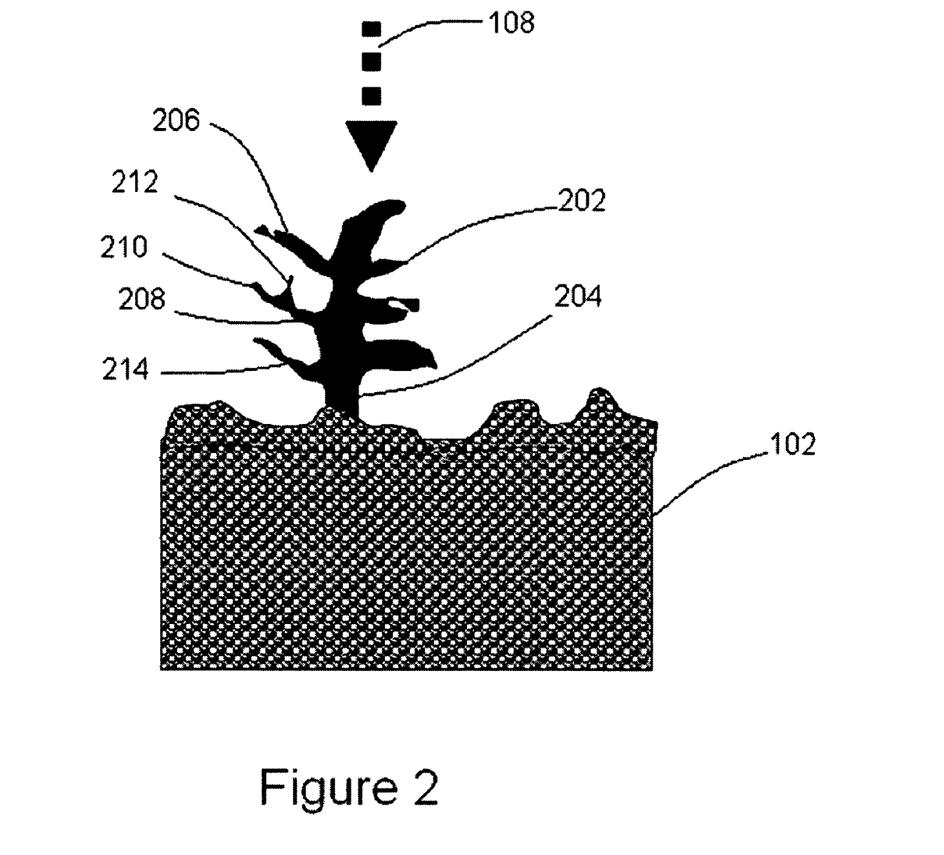
FIG. 2 is a side view of a branched nanostructure growing from a porous substrate.

Turning to FIG. 2, a schematic diagram showing a side view of the PSi film 102 is described. From the surface point at which the electron beam 108 is directed, a nanorod forms which, under continued beam radiation, branches to form a nanotree 202. The nanotree 202 has a trunk (or body) 204 and a number of branches, including branch 206, branch 208, branch 210 and branch 212. Because branch 206 is near the top of the nanotree 202, it is considered an upper branch. Likewise, because branch 214 is near the bottom of the nanotree 202, it is considered a lower branch. Branches 210 and 212 grew from branch 208. Because Branches 210 and 212 were formed later, they tend to be narrower in diameter than the inner or mother branch 208. At the bottom of the trunk 204, the nanotree 202 connects to the PSi film 102. This connection forms the base of the nanotree 202, or to continue with the tree analogy, forms the root.

Figure 3:
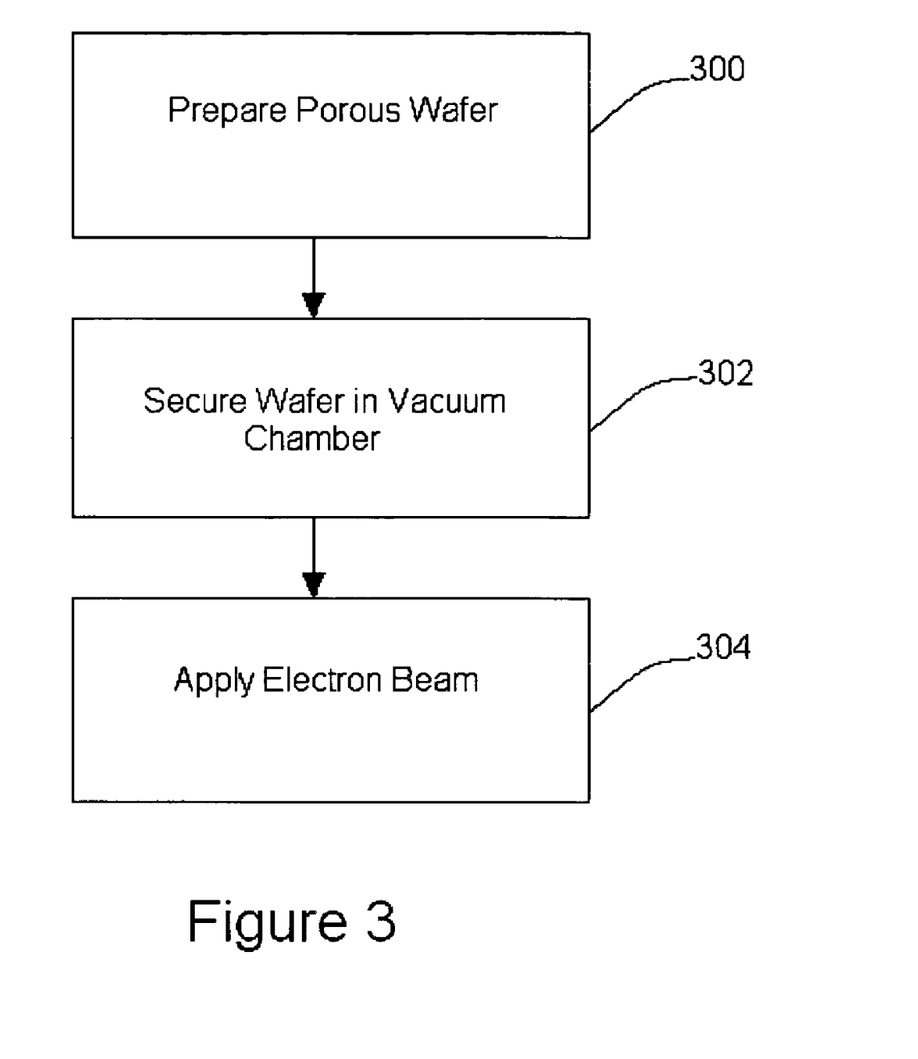
FIG. 3 is a block diagram showing steps of synthesizing a branched nanostructure.

Turning to FIG. 3, the steps of synthesizing a branched nanotree are further described. At step 300, the process begins with the preparation of the material from which the branched nanostructure will be formed. This is prepared as a microporous structure with pores on the order of microns or less. The pores may be as small as nanometers. The microporous structure reduces electrical and thermal conductivity. The structure also has corners or edges. These are useful in concentrating the electric field by charging during the bombardment by an electron beam.

A number of known techniques can be used to form the microporous structure. For example, it can be formed by electrochemical anodization of a solid material. This technique can be applied to a solid silicon wafer approximately 200-300 μm thick with <100> crystalline orientation on a polished surface. The wafer is dried using the critical point drying method. This method is described by Canham, et al., "*Luminescent anodized silicon aerocrystal networks prepared by supercritical drying*", Nature 368, 133 (1994), which is incorporated by reference in its entirety. Further details of the preparation of a PSi film are provided by Posada, et al., Optical properties of nanocrystalline silicon within silica gel monoliths, Journal of Applied Physics, 96, 2240 (2004), which is also incorporated by reference in its entirety, or in books like Electrochemistry of Silicon by Volker Lehmann, Wiley-VCH Verlag, Weinheim, Germany 2002 and Electrochemistry of silicon and its oxide, by X Gregory Zhang, Kluwer Academic/Plenum Publishers, New York, N.Y. 2001. The porous films will be prepared with thicknesses ranging from 1 micron to hundreds of microns. Porous alumina films could also be used, as could porous films made from other oxides or semiconductors.

The PSi films typically exhibit a granular-like structure corresponding to Si nano-sized particles and nano-sized wires, having a diameter on the order of 3 nm. This granularity is shown in FIG. 4b as the PSi portion 402. Quantum confinement of free carriers occurs at these dimensions, reducing the carriers' mobility and, therefore, showing very poor electrical conductivity in the film.

At step 302, a piece of the porous wafer is positioned in a vacuum chamber of a TEM, such as a JEOL 100S TEM, which operates at 100 kV. These are commercially available from JEOL USA, Inc., 11 Dearborn Road, Peabody, Mass., 01960. Another suitable TEM is the LEO-922 HRTEM, which operates at 200 kV. The film has a surface area on the order of 1 mm$^2$. It is attached to the conductive grid of the TEM. Suitable grids include copper, berilium-copper and nickel. Samples can be fixed to the grids with conductive TEM paste, such as silver paste, or by using folding TEM grids. The grid is then positioned in a standard TEM sample holder. With the PSi film in place, the vacuum chamber is evacuated below $5 \times 10^{-6}$ Torr.

At step 304, the electron beam is focused on an edge of the porous material. The electron beam intensity is adjusted to the condition in which one or several nano-sized nodules begin to form, these grow into whiskers, lately, the beam intensity is adjusted and the growth process continues with the formation of nanorods that finally begin to branch. The electron irradiation is maintained until the desired size of the multibranched structure is reached. The thickness and length of the nanorods and nanotree's branches can be controlled by increasing (or decreasing) the electron beam intensity and/or irradiation time.

Returning to FIG. 4(b), the initial growth of a branched nanostructure is shown. The porous film 402 exhibits granularity. Its surface is subject to electron bombardment, which causes the grains to merge into a dense area 404 along the surface. From this dense area 404 an active site, or nodule, 406 begins to form. Continued bombardment transforms this into a nanorod and then a branched nanostructure.

Figure 4A:
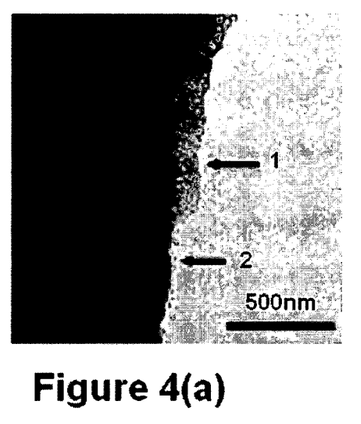
Figure 4B:
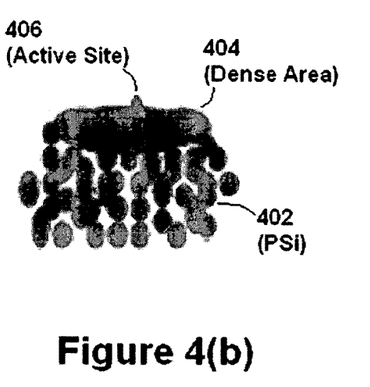

With reference to FIG. 4(a), the unirradiated portion 1 of the porous film retains its original morphology. The irradiated portion 2 of the porous film condenses as the individual nano-sized grains form a dense surface. Local Joule heating due to the electron irradiation causes the atoms to diffuse. The region at the sample boundary begins to coalesce, which creates a less porous layer with some protrusions or nodules forming at the surface. These protrusions become active sites where growth of branched nanostructures occurs.

Figure 5A:
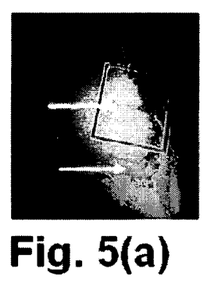
Figure 5B:
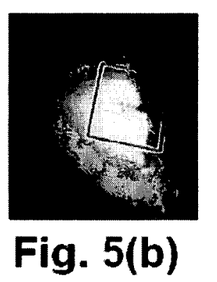
Figure 5C:
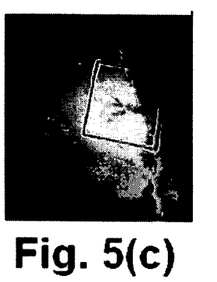
Figure 5D:
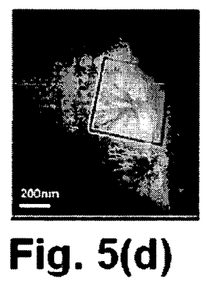
Figure 5E:
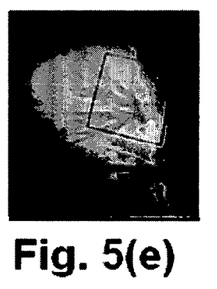
Figure 5F:
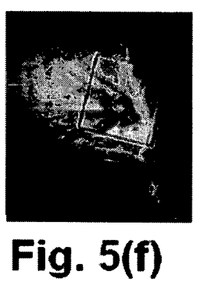

Turning to FIGS. 5(a)-(f), this growth is shown for a PSi sample irradiated under a voltage of 100 kV. The figures are shown sequentially in time, with the elapsed time from FIG. 5(a) to FIG. 5(f) totaling approximately 30 minutes. The initial image of FIG. 5(a) shows two small (approximately 30 nm) protrusions or active sites from which nanotrees grow. Continuous branching sprouts in a fractal-like manner at the same time that the mother branches gain thickness. After 30 minutes of irradiation, the distance between the farthest branch tip and the tree root was approximately 850 nm. During this period, the trunks increased in thickness from approximately 30 nm to approximately 100 nm.

While the two trees shown in FIGS. 5(a)-(f) show substantial similarities, they also exhibit some significant differences. Specifically, the lower tree sprouts from a thinner columnar protrusion that the upper one. Although the upper tree is, therefore, better attached or rooted than the lower one, its growth rate is slower.

These figures also reveal that the surface continuously smoothens as the trees grow. Then, after prolonged periods of radiation exposure, the growth of the nanotrees stops. In fact, coalescence takes place at the youngest branches, which become reduced in length and increased in thickness. This is seen on the upper branch of the lower nanotree during the last two stages shown in FIGS. 5(e) and 5(f).

Figure 6:
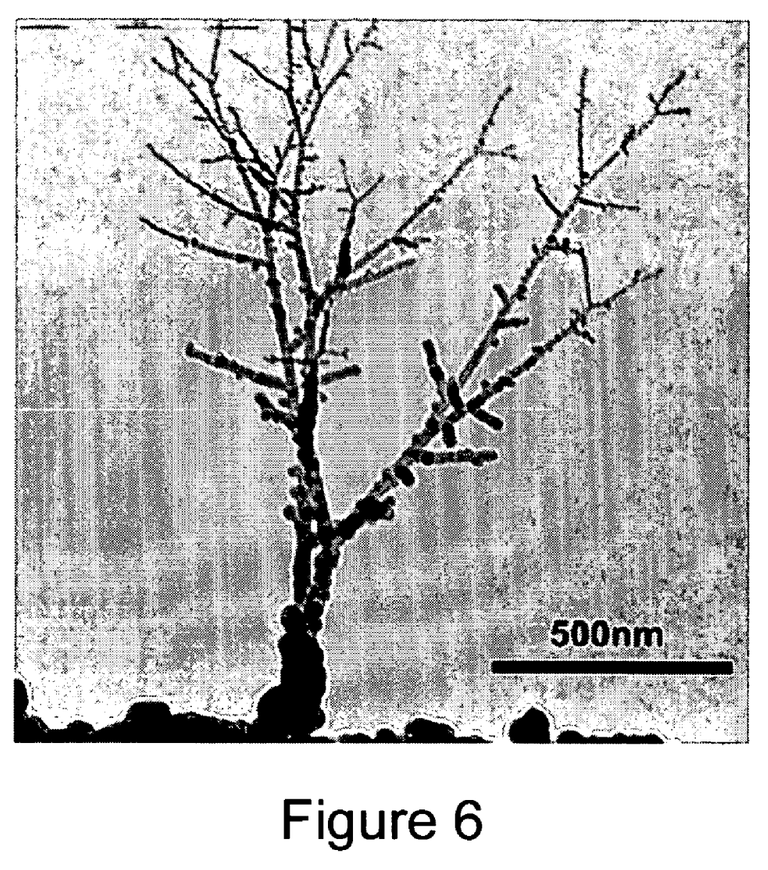
FIG. 6 is another photograph showing a branched nanostructure grown from a porous substrate.

Turning to FIG. 6, another nanotree fabricated according to the forgoing method is shown. It exhibits more than six sequential branching events. Its total height is on the order of 1500 nm and its longest branches extend a distance on the order of 1000 nm. The diameter of its trunk is on the order of 100 nm, the diameter of the oldest or mother branches as they connect with the trunk is on the order of 50 nm or less and the diameter of the youngest branches near the top of the nanotree is less than 20 nm.

Figure 7:
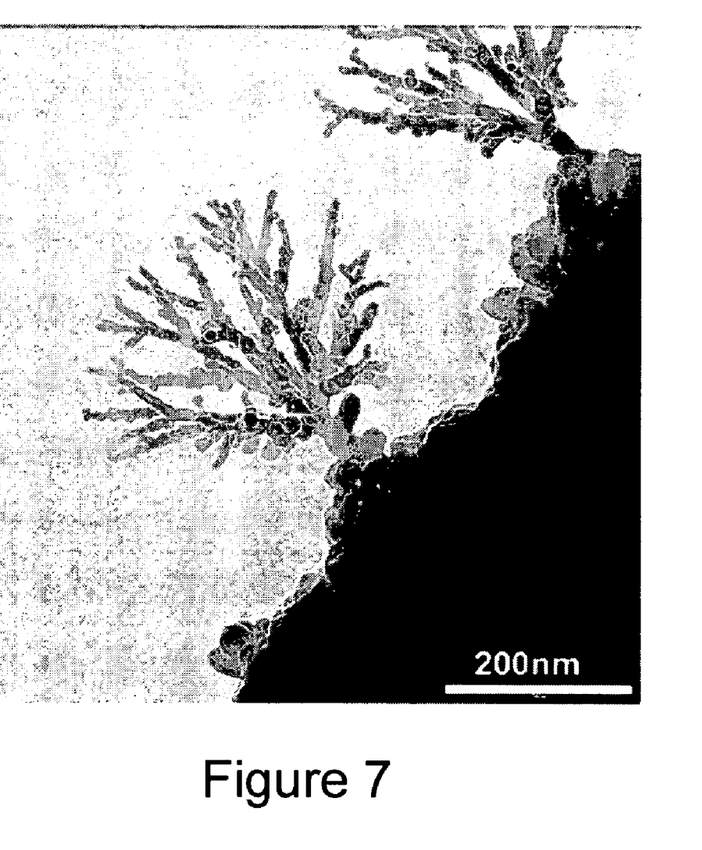
FIG. 7 is another photograph showing a branched nanostructure grown from a porous substrate.

Turning to FIG. 7, yet another nanotree fabricated according to the forgoing method is shown. It exhibits reduced length and increased thickness of the upper branches, which resulted from prolonged electron beam irradiation. It has a total height of approximately 400 nm.

Figure 8:
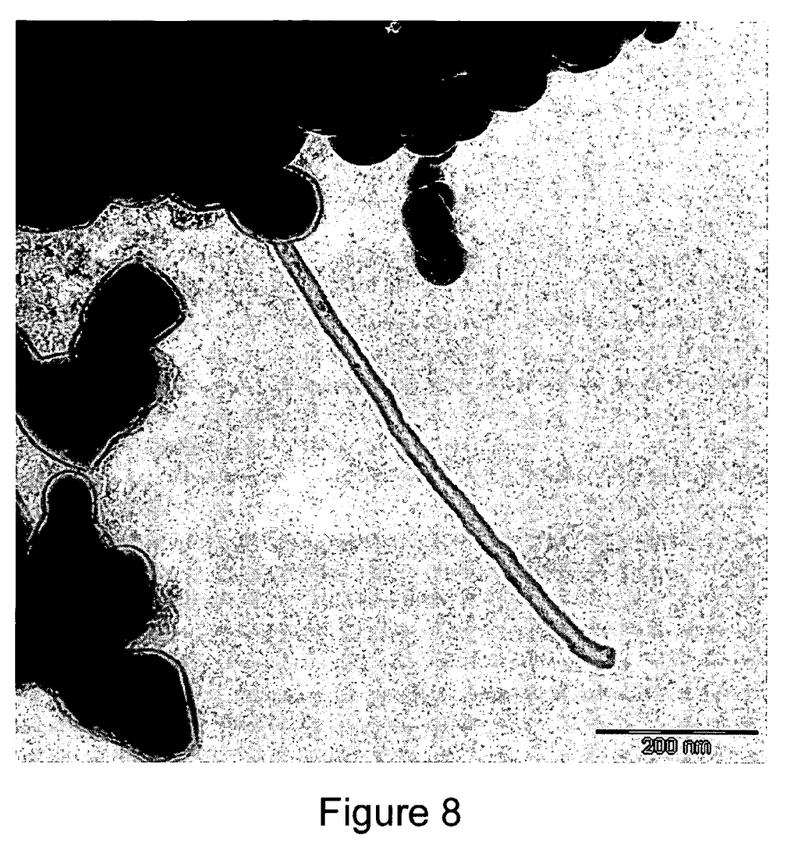
FIG. 8 is another photograph showing a one-branch nanostructure.

Turning to FIG. 8, one further nanostructure is shown. It is a single branch from the substrate. It has a diameter of approximately 50 nm and a length of approximately 700 nm.

Again, in addition to PSi, other porous films can be used following the above-described methods, including porous alumina or other oxides or semiconductors.

Although the invention has been described with reference to specific preferred embodiments, those skilled in the art will appreciate that many modifications and variations can be made without departing from the teachings of the invention. All such modifications and variations are intended to be encompassed within the scope of the following claims.

We claim:

1. A method of growing branched nanostructures comprising the steps of:
   providing a porous substrate,
   directing an electron beam at the porous substrate; and
   growing a branched nanostructure from the porous substrate as a consequence of directing said electron beam at the porous substrate.

2. The method of claim 1, wherein the step of providing the porous substrate comprises providing a porous silicon substrate with pores having a diameter of approximately a micron or less.

3. The method of claim 2, wherein the step of providing the porous silicon substrate comprises electrochemical anodization of a solid silicon wafer.

4. The method of claim 3, wherein, in the step of providing the porous silicon substrate, the silicon wafer is approximately 200-300 µm thick with <100> crystalline orientation on a polished surface.

5. The method of claim 1, wherein the step of directing the electron beam at the porous substrate comprises directing the electron beam at an edge of the porous substrate.

6. The method of claim 1, wherein the method further comprises the step of placing the porous substrate in a vacuum prior to the step of directing the electron beam at the porous substrate.

7. The method of claim 6, wherein, in the step of placing the porous substrate in the vacuum, the vacuum is evacuated below at least $5 \times 10^{-6}$ Torr.

8. The method of claim 7, wherein the step of placing the porous substrate in the vacuum comprises placing the porous substrate in a transmission electron microscope.

9. The method of claim 1, wherein the branched nanostructure has a body and at least two branches, wherein the branched nanostructure has a total length of at least 5 nm, wherein the body has a diameter of not more than 100 nm and wherein the at least two branches have a diameter of not more than 100 nm.

10. The method of claim 1, wherein the branched nanostructure has a body and at least two branches, wherein the body is at least 20 nm.

11. The method of claim 1, wherein the branched nanostructure has a body and at least two branches, wherein the body is at least 100 nm.

12. The method of claim 1, wherein the branched nanostructure has a single branch from the porous substrate.

13. The method of claim 12, wherein the branch is greater than 100 nm long and has a diameter of less than 100 nm.

14. A branched silicon nanostructure synthesized according to the method of claim 1.

15. A method of fabricating a branched nanostructure comprising:
   providing a porous material with pores having a diameter of approximately 1 µm or less;
   placing the porous material in a vacuum; and
   irradiating the porous material with an electron beam, wherein the electron beam causes a trunk to grow from the porous material and further causes branches to grow from the trunk.

16. The method of claim 15, wherein, in the step of providing the porous material, the porous material has pores 1 µm or less in diameter.

17. The method of claim 15, wherein the step of providing the porous material comprises providing porous silicon.

18. The method of claim 15, wherein the step of providing the porous material comprises providing porous alumina.

19. The method of claim 15, wherein the step of placing the porous substrate in a vacuum comprises placing the porous substrate in a transmission electron microscope.

20. The method of claim 19, further comprising the step of adjusting an intensity of the electron beam based upon growth of the trunk and branches.

21. The method of claim 15, wherein the step of irradiating the porous material with the electron beam is performed for less than an hour.

22. The method of claim 15, wherein, in the step of irradiating the porous material, the electron beam experiences a potential difference of between approximately 50 and 200 kV.

23. The method of claim 15, wherein, in the step of irradiating the porous material, the trunk and branches have a diameter of less than 100 nm.

24. The method of claim 23, wherein, in the step of irradiating the porous material, at least one of the branches has a length of at least 1000 nm.

* * * * *